June 13, 1967  B. J. KAVANAUGH  3,324,742
CONTROL MECHANISM FOR ROTATING HEADS ON ROTARY
INDEXING TURRET TYPE MACHINES
Filed Sept. 24, 1964  3 Sheets-Sheet 2

Inventor:
Bernard J. Kavanaugh
by Otto Tichy
His Attorney

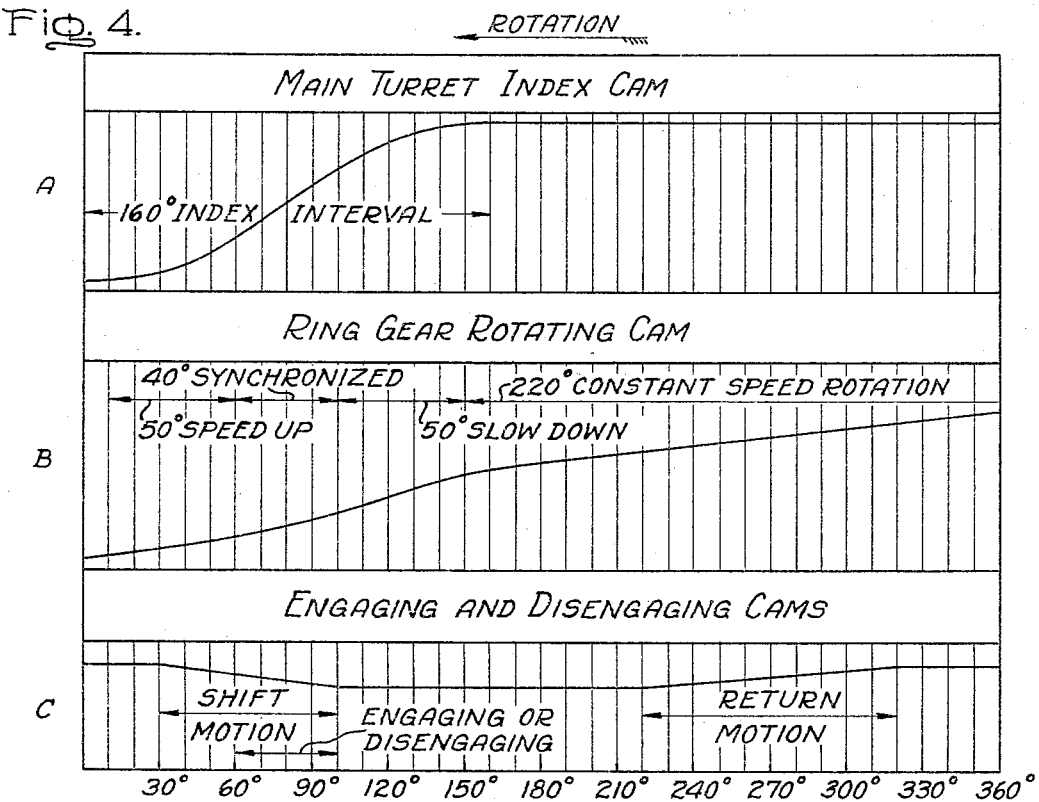

United States Patent Office 3,324,742
Patented June 13, 1967

3,324,742
CONTROL MECHANISM FOR ROTATING HEADS ON ROTARY INDEXING TURRET TYPE MACHINES
Bernard J. Kavanaugh, Willowick, Ohio, assignor to General Electric Company, a corporation of New York
Filed Sept. 24, 1964, Ser. No. 399,040
9 Claims. (Cl. 74—665)

This invention relates generally to machines of the type comprising a rotary turret adapted to be indexed by intermittent rotation thereof and to be held stationary at work stations between the intermittent movement thereof, and which carries a plurality of heads which are mounted for rotation about their own axes. More particularly, the invention relates to machines of the type described and including means for effecting rotation of said heads about their axes at certain of said work stations and for holding said heads against rotation at other work stations.

It has been the practice heretofore to effect rotation of the heads through belts or through gearing operating in conjunction with the indexing movements of the turret as effected by a single index cam.

It is an object of the present invention to provide a novel control mechanism which is capable of operation with a turret operating at substantially greater indexing speeds, and with positive and accurate positioning of the heads.

In accordance with the invention, in order to achieve indexing movement of a heavy main turret at high speeds a turret indexing cam is adapted to rotate the turret at a varying rate of acceleration and deceleration throughout its indexing movement and, in conjunction therewith, a concentrically arranged secondary turret carrying a ring gear and driven by a separate second index cam is provided and is adapted to effect rotation of the heads on the main turret, through gearing said head effectively engageable with said ring gear, during the stationary periods of the main turret which holds the heads at a certain series of stations, and said second index cam operates in precise synchronism with the main turret indexing cam during certain intervals of its indexing cycle in order to prevent relative rotation of said ring gear and gearing and permit disengagement and re-engagement of said gearing with said ring gear during the varying rate of indexing movement of the main turret while it is indexing the individual heads away from and to said certain series of stations.

Further features and advantages of the invention will appear from the following detailed description of a species thereof and from the drawings wherein.

Figure 3:
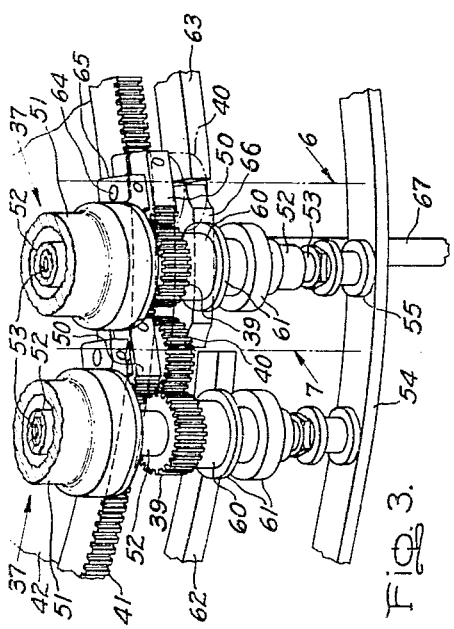

FIGURE 3 is a fragmentary perspective view showing the lower end of two heads on the main turret and associated mechanism whereby one head is located between station 6 and 7 and is about to be released from a locked position to a position where it is effectively engaged for rotation as shown by the head which is located between station 7 and 8; and FIGURE 4 is a timing chart for the main and secondary turret index cams, and the cams for effecting engagement and disengagement of the head as regards rotation thereof.

Figure 2:
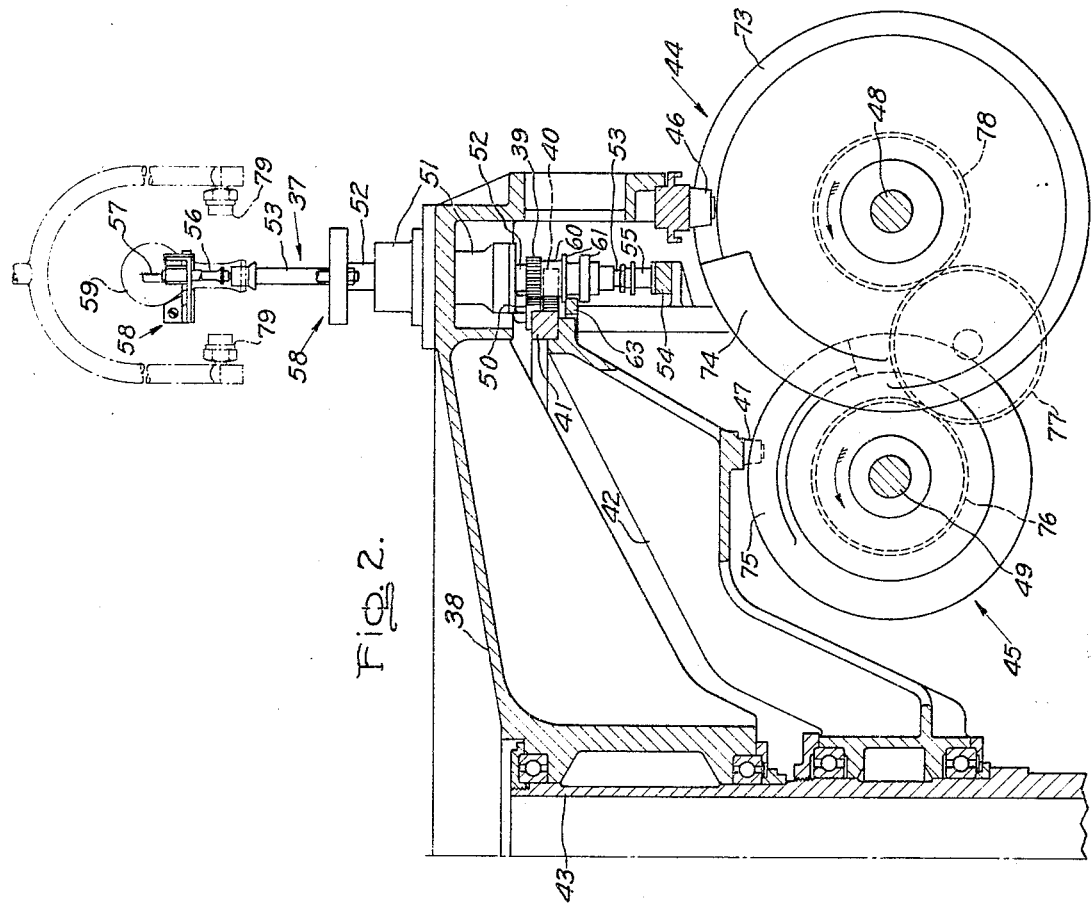
FIGURE 2 is a vertical section through the turrets at a point adjacent station 1 (FIG. 1) of a 36-head machine, and including a showing, in broken lines, of sealing burners and a lamp bulb and mount as they actually appear at certain other stations.

In general, and briefly stated, in the operation of the machine illustrated herein, a plurality (36) of heads 37 are mounted at the periphery of an upper main turret 38 (FIGURE 2). A driven gear 39 at the lower end of each head 37 is arranged to be effectively engageable, in this case through an intermediate gear 40, with a large ring gear 41 which is carried by a lower secondary turret 42. When both turrets 38 and 42 revolve at equal speeds there is no rotation of the heads 37, but when the main turret 38 stops during the idle, or working cycle, the lower turret 42 continues to rotate to thereby rotate those heads 37 which have their driven gears 39 in effective engagement with ring gear 41 through associated intermediate gears 40. There are 23 fire or heating positions or stations, and at each of those stations the head 37 rotates a predetermined amount such that the head is at the same angular position at the end as at the beginning of the heating stations.

There are 13 positions, or stations, during which rotation of the heads 37 is prevented. This is done by effectively disengaging the driven gear 39 of the head 37 from the lower turret 42 and ring gear 41, more particularly by raising said gear 39 out of engagement with the associated intermediate gear 40.

More particularly, the two turrets 38 and 42 are caused to rotate about a pedestal 43 (FIGURE 2) by primary rotation of respective index cams 44 and 45 through engagement with cam rollers 46 and 47 on the respective turrets.

Differential rate of motion between turret 38 and turret 42 causes the head 37 to rotate, through driven gear 39, intermediate gear 40 and ring gear 41. The differential motion between the two turrets is due to the fact that the cam 44 has a configuration such that it imparts motion to turret 38, through a roller 46, for only 160° of its rotation, whereas the cam 45 has a configuration such that it imparts motion to the turret 42, through rollers 47, for the full 360° of its rotation. In the particular form illustrated herein, the main turret 38 has 36 cam rollers 46 (one for each head 37) and the secondary turret 42 has 18 cam rollers 47. Accordingly, for each machine cycle, or for each rotation of cam 44 and cam 45 on their respective cam shafts 48 and 49, the main turret 38 is caused to rotate the spacing between successive heads 37, or 10 degrees, while turret 42 rotates 20 degrees. The extra 10 degrees of rotation of turret 42 occurs during the time the main turret 38 is idle, or stationary, during its working cycle. That is, the lower turret 42 continues to rotate for 10 degrees which, in turn, through its ring gear 41 and intermediate gear 40, rotates the head 37 through its driven gear 39.

Figure 1:
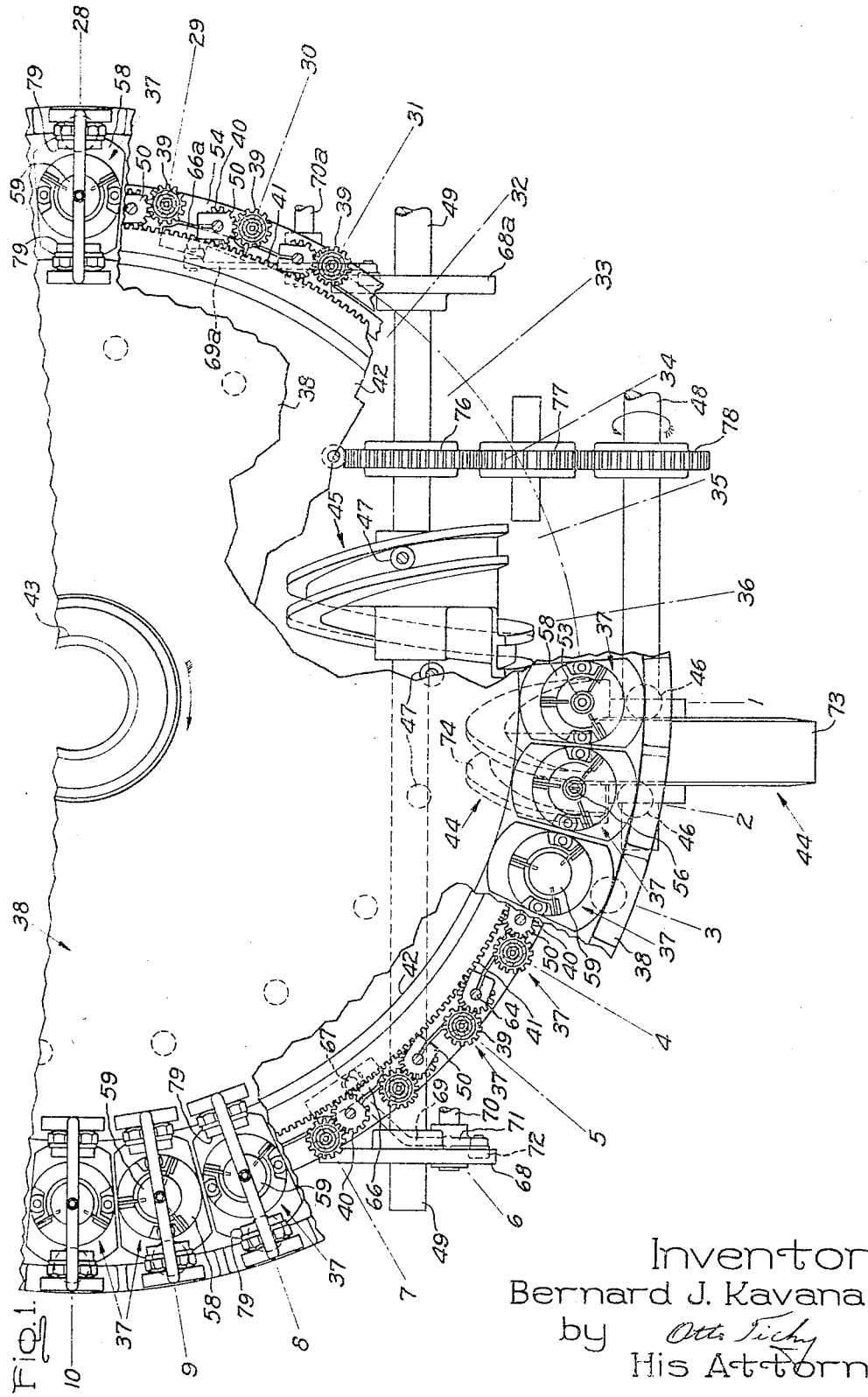
FIGURE 1 is a plan view of half of a machine comprising the invention, with certain portions of main and secondary turrets and portions of the heads at certain stations removed in order to show portions of the operating mechanism therefor, the particular machine illustrated being a lamp sealing machine.

As illustrated in the drawings, the rotation of the heads 37 occurs in 23 positions, or stations 7 to 29 inclusive, and rotation of the heads is prevented at the other 13 stations. This prevention of rotation of heads 37 is accomplished by shifting the driven gear 39 upward out of engagement with the associated intermediate gear 40, which gear 40 is in constant engagement with the ring gear 41, and bringing gear 39 into locked engagement with a fixed gear segment 50 (FIGURES 1 and 3). The driven gear 39 on a head 37 is shifted during the time that the upper turret 38 is moving in its index cycle. The constantly varying angular speed of this turret 38 is precisely matched, over part of the index cycle, by a synchronized varying angular speed of the lower turret 42 during the said part of the index cycle. Because there is then no relative movement between the two turrets, the driven head gear 39 may be disengaged from the ring gear 41 and intermediate gear 40, and engaged with the locking segment 50.

Referring still more specifically to the structure and operation of the machine illustrated in the drawings, it is a sealing turret of a type of machine generally well-known in the lamp making art. The heads 37 may be of a type generally similar to that shown, for example, in Patent 2,679,714 to N. E. Kewley. Each head 37 comprises a journal member 51 which is fixedly mounted in the turret 38 and which carries a sleeve 52 mounted for rotation in said journal. A spindle 53 (FIGURE 2) is mounted within a sleeve 52 and keyed thereto for rotation therewith and for vertical reciprocation therein, the said spindle being supported at its lower end on a cam track 54 through a nut-like shoe 55 (FIGURE 3) on said spindle. The said spindle 53 supports, at its upper end, a lamp mount which includes a flared glass stem 56 (FIGURE 2) on which is supported a filament 57. The head also includes a support means 58 for a glass bulb 59 which encloses the mount structure 56, 57, the said bulb support means 58 being carried by said sleeve 52 for rotation therewith along with the spindle 53.

The head driven gear 39 is carried by an outer sleeve member 60 which is splined to sleeve 52 so as to rotate said sleeve 52 and spindle 53 but permit vertical reciprocation on said sleeve 52. Said outer sleeve 60 also carries a collar means 61, actually here shown as a pair of spaced collars. During the time the respective heads are at stations 7 to 29 inclusive, where they are rotated, the said collar 61 (or at least the under surface of the upper collar) is in engagement with a track 62 (FIGURE 3) which holds the sleeve 60 at an elevation such that the head gear 39 is in meshing engagement with the intermediate gear 40 which is constantly in engagement with the ring gear 41.

During the time the heads 37 are at stations 30 to 36 and 1 to 6, where they are not rotated, the collar 61 is in engagement with a track 63 (FIGURE 3) which is at a higher elevation than track 62 and which holds the head gear 39 above and out of engagement with its associated intermediate gear 40 and in locked engagement with the associated fixed gear segment 50. The said gear segment 50 is clamped to a pin 64 which is, in turn, mounted in a lateral extension 65 of the journal member 51 and is therefore fixedly supported. The intermediate gear 40 is mounted for rotation about the pin 64 and in meshing engagement with the ring gear 41. The disengagement and re-engagement of the head rotating gears 39 by shifting the collars 61 to and from engagement with the arcuate gear controlling tracks 62 and 63 is effected by similar cam operated shifter mechanisms. In shifting from nonrotating position, wherein the collar 61 is in engagement with control track 63, as a head 37 leaves station 6 in the course of indexing to station 7, the collar 61 comes into engagement with a movable track segment 66 which is, at that time, at the level of the upper track 63. During indexing, the said segment 66 is lowered to the elevation of the lower track 62, whereby the driven head gear 39 is disengaged from the fixed gear segment 50 and meshes with the intermediate gear 40 to thereby permit rotation of the spindle 53 and the bulb holder 58 through rotation of the outer sleeve 60 when it reaches station 7 and the upper turret 38 comes to rest.

The shifter track segment 66 is actuated by a vertical support rod 67 under the control of a cam which is indicated at 68 (FIGURE 1) and is mounted on the cam shaft 49. The said rod 67 may be connected at its lower end to the horizontal arm 69 of a lever which is pivoted about a shaft 70 and which has another arm 71 which carries a roller 72 which rides in a track in the face of cam 68.

A similar track segment 66a (FIGURE 1) is located between stations 29 and 30 and is similarly actuated by a cam indicated at 68a and also mounted on the cam shaft 49 which carries the lower turret actuating cam 45. The track segment 66a, of course, raises the head driven gear 39 by virtue of the fact that the collar 61 of a head leaves a lower control track 62 to engage the segment 66a and is raised thereby to the level of the upper control track 63 and to also cause said gear 39 to engage the associated fixed gear segment 50 so as to be locked against rotation and hold the spindle 53 and bulb holder 58 in a fixed angular position during its travel from station 30 and through stations 36 and 1 to station 6.

The indexing cam 44 for the upper, or sealing, turret 38 is of generally conventional type comprising a continually rotating disk portion 73 which is keyed to the main drive shaft 48, and which fits snugly between a successsive pair of cam rollers 46 on the turret 38 to hold the turret stationary during its dwell or working cycle. Mounted on the disk portion 73 is a spirally grooved cam segment 74, in this case of 160° arcuate extent, which successively engages the rollers 46 for indexing the turret 38 to carry the head 37 from station to station. Heretofore, the cam segments 74 were shaped to gradually accelerate the turret, then hold it at a constant angular speed, and then decelerate it.

In the present case, in order to achieve high index speed of a massive turret with a smooth motion, the cam segment 74 is shaped similar to a modified trapezoid curve configuration to move the turret 38 at a continuously varying speed of acceleration and deceleration in accordance with section A of the time chart shown in FIGURE 4, more particularly the portion thereof indicated by the legend "160° index interval." It is for this reason that the ring gear 41 on turret 42 cannot be continuously rotated at a constant speed, for then there would be relative motion between the two turrets 38 and 42 even during the entire index period of turret 38 which would prohibit effective engagement and disengagement of the head rotating driven gear 39 with the intermediate gear 40. Therefore, in accordance with the invention, the ring gear 41, and its turret 42, is rotated by a separate spiral cam 45 in accordance with section B of the time chart (FIGURE 4). Thereby, during the index of turret 38 in accordance with chart section A (FIGURE 4), the turret 42 and ring gear 41 are first accelerated over a 50° interval and finally decelerated over another 50° interval (as indicated by the legends on chart B); however during a 40° intermediate interval the shape of segment 75 (FIGURE 2) of cam 45 is such that the angular speed of turret 42 exactly matches the varying angular speed of 38, and it is during this intermediate period that the shifter segments 66 and 66a are operated in accordance with section C of the time chart (FIGURE 4) to provide effective engagement and disengagement of the heads 37 with the ring gear 41.

The ring gear rotating cam 45 is, of course, proportioned to engage a succeeding cam roller 47 before it leaves contact with the preceding roller 47. The shaft 49 carrying said cam 45 is here shown as driven from the main cam shaft 48 through the gear train 76, 77 and 78.

The operation of the sealing turret is otherwise conventional, the mounts 56, 57 (FIGURE 1) being fed or placed on the upper ends of the spindles 53 while they are in a lowered position at one of the stations (station 2, for instance) where they are held against rotation. The bulbs 59 are fed into the holders 58 at another stationary station (station 3, for instance). The spindle 37 is then raised by track 54 (FIGURE 3) to properly locate the mount within the bulb, and the bulb neck is fused to the flared stem 56 by opposed stationary burners 79 (FIGURES 1 and 2) in the course of travel of the head 37 between stations 7 and 29.

It will be evident that various modifications, omissions and changes may be made in the construction of the machine within the spirit of the invention. For example, the intermediate gear 40 might be omitted, and the head driven gear 39 made to mesh directly with the ring gear 41. However, a change of gears in the system might be made to permit the head gears 39 to rotate at a faster or slower speed.

What I claim as new and desire to secure by Letters Patent of the United States is:

1. In a machine of the character described, the combination of a rotatable main turret having a plurality of heads rotatably mounted at equally spaced intervals about the periphery thereof, a driven gear carried by each of said heads, main turret indexing means including cam means for rotating said turret intermittently at a constantly varying angular speed and for holding said turret stationary between the intermittent movements thereof with its heads located at given corresponding stations, a secondary rotatable turret concentric with said main turret, means including a ring gear carried by said secondary turret for effecting rotation of said heads through their driven gears, secondary turret indexing means including secondary cam means for rotating said secondary turret and said ring gear continuously whereby to effect rotation of the heads at a first series of successive stations through their driven gears during the intervals that said main turret is held stationary and said driven gears are in effective engagement with said ring gear, means for effecting disengagement of the driven gear on each of said heads from effective engagement with said ring gear during the intermittent rotation of said main turret carrying each said head from the last one of said first series of successive stations to the next station, means for maintaining said driven gears out of effective engagement with the ring gear throughout a succession of indexing movements of the main turret carrying said heads to a second series of stations including the aforesaid next station, and means for restoring effective re-engagement of the driven gear of each said head with the ring gear during the intermittent movement of the upper turret which carries each said head from the last one of said second series of stations to the first one of said first series of stations, the secondary cam means being contoured to periodically provide a varying angular speed of the secondary turret which precisely matches the varying angular speed of the main turret during a portion of its indexing cycle coinciding with the periods of effective disengagement and re-engagement of the said driven gears with the ring gear.

2. A machine as set forth in claim 1 including auxiliary locking gear means supported from said main turret in a fixed non-rotatable manner adjacent each head and in position to be engaged by the driven gear of the associated head upon its effective disengagement from said ring gear to thereby hold said head in a fixed angular position.

3. In a machine of the character described, the combination of a main upper turret and a secondary lower turret mounted for independent rotation about a common axis, a plurality of rotatable heads mounted at equally spaced intervals about the periphery of the upper turret, a ring gear carried by said lower turret adjacent said heads, a driven gear carried by each said head and mounted for vertical reciprocation along its axis to be selectively movable into and out of effective meshing engagement with said ring gear, upper turret indexing means including cam means for rotating said upper turret intermittently at a constantly varying angular speed and for holding said turret stationary between the intermittent movements thereof with its heads held at given corresponding stations, a spearate secondary cam means for rotating said lower turret and ring gear continuously whereby to effect rotation of the heads at a first series of successive stations through their driven gears during the intervals that said upper turret is held stationary and said driven gears are in effective engagement with said ring gear, means for effecting vertical movement and disengagement of the driven gear on each of said heads from effective engagement with said ring gear during the intermittent rotation of said upper turret carrying said head from the last one of said first series of successive stations to the next station, means for maintaining the driven gear of each said head out of effective engagement with the ring gear throughout a succession of indexing movements of the upper turret carrying said heads to a second series of stations including the aforesaid next station, and means for effecting vertical movement and effective re-engagement of each the driven gear of said head with the ring gear during the intermittent movement of the upper turret which carries each said head from the last one of said second series of stations to the first one of said first series of stations, the secondary cam means being contoured to periodically provide a varying angular speed of the lower turret which precisely matches the varying angular speed of the upper turret during a portion of its indexing cycle coinciding with the periods of effective disengagement and re-engagement of the said driven gears with the ring gear.

4. A machine as set forth in claim 3 including locking means on said upper turret engageable by said heads upon effective disengagement from said ring gear and holding said heads in a fixed angular position.

5. A machine as set forth in claim 4 wherein said locking means is a gear segment adjacent each head located to be engaged by the driven gear of said head upon movement of said driven gear out of effective engagement with the ring gear.

6. A machine as set forth in claim 3 including an intermediate gear carried by said upper turret adjacent each said head on the upper turret, each said intermediate gear being in constant meshing engagement with said ring gear and located to be engaged by the driven gear on the associated head to provide the said rotation of the heads.

7. A machine as set forth in claim 6 including a locking gear segment mounted in a fixed position on the upper turret and in vertical alignment with each said intermediate gear to be in position for engagement by the driven gear of the associated head when it is moved out of engagement with said intermediate gear.

8. In a machine of the character described, the combination of a main upper turret and a secondary lower turret mounted for independent rotation about a common axis, a plurality of rotatable heads mounted at equally spaced intervals about the periphery of the upper turret, a ring gear carried by said lower turret adjacent said heads, a driven gear and an attached shoe member carried by each said head and mounted for vertical reciprocation along its axis to be selectively movable into and out of effective meshing engagement with said ring gear, a lower arcuate horizontal track member extending around a portion of the secondary turret under said ring gear and engageable by the said shoe members on said heads and located at an elevation to maintain said driven gear members on said heads in effective engagement with said ring gear over a first series of successive stations occupied by said heads, an upper arcuate horizontal track member extending around another portion of the secondary turret under said ring gear and engageable by the said shoe members on said heads and located at an elevation higher than that of the lower turret to maintain said driven gear members on said heads above and out of effective engagement with said ring gear over a second series of successive stations occupied by said heads, said lower and upper arcuate tracks having their ends spaced horizontally apart to leave a pair of gaps across successive pairs of stations at the ends of said first and second series of stations, a short horizontal track segment spanning each of the said gaps, means for lowering and raising each of said short track segments in synchronism with the indexing movement of the upper turret to be in horizontal alignment with respective lower and upper arcuate tracks and in proper timed sequence such that one short track segment receives the shoe member of a head leaving the trailing end of the lower track and the last one of said first series of stations and raises it to a position to be transferred to the leading end of the upper track and the first one of said second series of stations while the other short track segment receives the shoe member of a head leaving the trailing end of the upper track and the last one of said second series of stations and lowers it to a position to be transferred to the leading end of the lower track and the first one of said first series of stations, upper turret indexing means including cam means for rotating said upper turret intermittently at a constantly varying angular speed and to hold said turret stationary between the intermittent movement thereof with its heads held at given corresponding stations, a separate secondary cam means for rotating said lower turret and ring gear continuously whereby to effect rotation of the heads at said first series of successive stations through their driven gears during the intervals that said upper turret is held stationary and said driven gears are in effective engagement with said ring gear, said secondary cam means being contoured to periodically provide a varying angular speed of the lower turret which precisely matches the varying angular speed of the upper turret during a portion of its indexing cycle coinciding with the periods of effective disengagement and re-engagement of the said driven gears with the ring gear.

9. A machine as set forth in claim 8 including a locking gear segment fixedly mounted on said upper turret adjacent each head and located to be engaged by the associated driven gear of said head upon movement of said driven gear out of effective engagement with the ring gear.

References Cited

UNITED STATES PATENTS

| | | | |
|---|---|---|---|
| 2,676,436 | 4/1954 | Zampieri | 74—660 X |
| 2,852,960 | 9/1958 | Brems | 74—825 X |
| 2,857,787 | 10/1958 | Natalis | 74—821 |
| 2,951,396 | 9/1960 | Kooistra | 74—600 |

FRED C. MATTERN, JR., *Primary Examiner.*

DAVID J. WILLIAMOWSKY, *Examiner.*

C. J. HUSAR, *Assistant Examiner.*